(12) United States Patent
Argyris et al.

(10) Patent No.: US 11,918,141 B2
(45) Date of Patent: Mar. 5, 2024

(54) BEVERAGE PREPARATION MACHINE AND METHOD FOR THE CONTROL OF A THERMAL CONDITIONING DEVICE OF SUCH A BEVERAGE PREPARATION MACHINE

(71) Applicant: SOCIETE DES PRODUITS NESTLE S.A., Vevey (CH)

(72) Inventors: Ioannis Argyris, Berne (CH); Eric Granger, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 463 days.

(21) Appl. No.: 16/492,228

(22) PCT Filed: Mar. 8, 2018

(86) PCT No.: PCT/EP2018/055692
§ 371 (c)(1),
(2) Date: Sep. 9, 2019

(87) PCT Pub. No.: WO2018/162609
PCT Pub. Date: Sep. 13, 2018

(65) Prior Publication Data
US 2020/0037812 A1 Feb. 6, 2020

(30) Foreign Application Priority Data

Mar. 10, 2017 (EP) ..................................... 17160448
Apr. 7, 2017 (EP) ..................................... 17165487

(51) Int. Cl.
*A47J 31/54* (2006.01)
*F24H 9/20* (2022.01)
(Continued)

(52) U.S. Cl.
CPC .......... *A47J 31/545* (2013.01); *F24H 9/2028* (2013.01); *F24H 15/219* (2022.01);
(Continued)

(58) Field of Classification Search
CPC ........ A47J 31/542; A47J 31/545; A47J 31/58; A47J 31/5253; F24H 1/10; F24H 9/2028;
(Continued)

(56) References Cited

U.S. PATENT DOCUMENTS 4,700,052 A 10/1987 Wolf et al.
10,022,012 B2 7/2018 Etter et al.
(Continued)

FOREIGN PATENT DOCUMENTS

CN 202006533 U 10/2011
CN 105996767 A 10/2016
(Continued)

OTHER PUBLICATIONS

Kim et al., "Temperature Control for an Oil Cooler System Using PID Control with Fuzzy Logic", vol. 13, Issue No. 4, Aug. 1, 2004, pp. 87-94.
(Continued)

*Primary Examiner* — Justin C Dodson
(74) *Attorney, Agent, or Firm* — K&L Gates LLP

(57) ABSTRACT

A beverage preparation machine (1) comprising a thermal conditioning device (71), such as a heater or cooler, said thermal conditioning device (71) comprising a control unit (4) for controlling a start-up phase of the thermal conditioning device (71) from a temperature of inactivity to an operative temperature, the control unit (4) comprising: a controller with a start-up profile for starting-up the thermal conditioning device (71), wherein the start-up profile has at least one parameter and the controller has a self-learning mode for adjusting the at least one parameter; and a tem-
(Continued)

perature sensor connected to the controller for measuring a temperature of the thermal conditioning device (71); wherein the self-learning mode causes the controller during a start-up phase to: calculate a ramp value representative of a rate of change in temperature during the start-up phase of the thermal conditioning device; adjust the at least one parameter as a function of the adjusted ramp value; use the adjusted at least one parameter for a remainder of the start-up phase. A method for operating and calibrating the thermal conditioning device of such a beverage preparation machine.

7 Claims, 3 Drawing Sheets

(51) Int. Cl.
  *F24H 15/219* (2022.01)
  *F24H 15/269* (2022.01)
  *F24H 15/37* (2022.01)
  *F24H 15/421* (2022.01)
  *F24H 15/486* (2022.01)
  *G05D 23/19* (2006.01)
  *F24H 1/10* (2022.01)
  *F24H 15/238* (2022.01)
  *F24H 15/242* (2022.01)

(52) U.S. Cl.
  CPC .......... *F24H 15/269* (2022.01); *F24H 15/37* (2022.01); *F24H 15/421* (2022.01); *F24H 15/486* (2022.01); *G05D 23/1919* (2013.01); *F24H 1/10* (2013.01); *F24H 15/238* (2022.01); *F24H 15/242* (2022.01)

(58) Field of Classification Search
  CPC . G05F 23/1919; G05F 23/1951; G05D 23/30; G05D 23/1919; G05D 23/1951
  See application file for complete search history.

(56) References Cited

U.S. PATENT DOCUMENTS

| | | | |
|---|---|---|---|
| 10,285,535 | B2 | 5/2019 | Florin et al. |
| 2007/0272155 | A1 | 11/2007 | Nozawa et al. |
| 2008/0114500 | A1 | 5/2008 | Hull et al. |
| 2010/0162897 | A1 | 7/2010 | Ozanne et al. |
| 2013/0018488 | A1* | 1/2013 | Tanaka ................ G05B 11/42 700/52 |
| 2014/0322401 | A1* | 10/2014 | Etter .................. A47J 31/56 99/281 |

FOREIGN PATENT DOCUMENTS

| | | | |
|---|---|---|---|
| DE | 102009021656 | 11/2010 | |
| JP | S61181092 A | 8/1986 | |
| JP | 2010519688 A | 6/2010 | |
| JP | 2013530780 A | 8/2013 | |
| RU | 125050 U1 | 2/2013 | |
| WO | WO-2005058747 A2 * | 6/2005 | ........... A47J 31/52 |
| WO | 2009130099 | 10/2009 | |

OTHER PUBLICATIONS

China Patent Office Action Received for Application No. 2018800127564, dated Mar. 18, 2021, 21 Pages.
Japan Patent Office Communication for Application No. 2019-548268, Dispatch No. 115483, dated Mar. 15, 2022, 13 pages.

\* cited by examiner

BEVERAGE PREPARATION MACHINE AND METHOD FOR THE CONTROL OF A THERMAL CONDITIONING DEVICE OF SUCH A BEVERAGE PREPARATION MACHINE

CROSS REFERENCE TO RELATED APPLICATIONS

The present application is a National Stage of International Application No. PCT/EP2018/055692, filed on Mar. 8, 2018, which claims priority to European Patent Application No. 17160448.1, filed on Mar. 10, 2017, and European Patent Application No. 17165487.4, filed on Apr. 7, 2017, the entire contents of which are being incorporated herein by reference.

FIELD OF THE INVENTION

The present invention relates to a beverage preparation machine comprising a thermal conditioning device with optimized start-up characteristics. The present invention relates in particular to a beverage preparation machine with a thermal conditioning device with optimized start-up characteristics, for heating or cooling a fluid, e.g. water, for preparing a beverage. The present invention further relates to a method for controlling the thermal conditioning device of such a beverage preparation machine, in particular for optimizing a start-up phase in order to accurately bring the thermal conditioning device of the beverage preparation machine to an operative temperature from a rest temperature.

For the purpose of the present description, a "beverage" is meant to include any liquid food, such as tea, coffee, hot or cold chocolate, milk, soup, baby food or the like. A "capsule" is meant to include any pre-portioned beverage ingredient within an enclosing packaging of any material, in particular an air tight packaging, e. g. plastic, aluminum, recyclable and/or bio-degradable packaging, and of any shape and structure, including soft pods or rigid cartridges containing the ingredient.

BACKGROUND ART

Beverage preparation machines have been known for a number of years. For example, U.S. Pat. No. 5,943,472 discloses a water circulation system between a water reservoir and a hot water or vapour distribution chamber of an espresso machine. The circulation system includes a valve, metallic heating tube and pump that are connected together and to the reservoir via different silicone hoses, which are joined using clamping collars.

EP 1 646 305 discloses a beverage preparation machine with a heating device that heats circulating water which is then supplied to the inlet of a brewing unit. The brewing unit is arranged to pass heated water to a capsule containing a beverage ingredient for its brewing. The brewing unit has a chamber delimited by a first part and a second part movable relative to the first part and a guide for positioning a capsule in an intermediate position between the first and second parts before moving the first and second parts together from an open to a closed configuration of the brewing unit.

In-line heaters for heating circulating liquid, in particular water, are also well known and are for example disclosed in CH 593 044, DE 103 22 034, DE 197 32 414, DE 197 37 694, EP 0 485 211, EP 1 380 243, FR 2 799 630, U.S. Pat. Nos. 4,242,568, 4,595,131, 5,019,690, 5,392,694, 5,943,472, 6,393,967, 6,889,598, 7,286,752, WO 01/54551 and WO 2004/006742.

More particularly, CH 593 044 and U.S. Pat. No. 4,242,568 disclose a coffee machine with an inline thermoblock heater having a metal mass with a resistive heating cable cast in the mass and with a duct for the circulation of water to be heated.

Thermoblocks are in-line heaters through which a liquid is circulated for heating. They generally comprise a heating chamber, such as one or more ducts, in particular made of steel, extending through a mass of metal, in particular a massive mass of metal, in particular made of aluminium, iron and/or another metal or an alloy, that has a high thermal capacity for accumulating heat energy and a high thermal conductivity for the transfer of the required amount of accumulated heat to the liquid circulating therethrough whenever needed. Instead of a distinct duct, the thermoblock's duct may be a through passage that is machined or otherwise formed in the thermoblock's body, e.g. formed during a casting step of the thermoblock's mass. When the thermoblock's mass is made of aluminium, it is preferred, for health considerations, to provide a separate duct, for example of steel, to avoid contact between circulating liquid and aluminium. The block's mass can be made of one or several assembled parts around the duct. Thermoblocks usually include one or more resistive heating elements, for instance discrete or integrated resistors, that convert electrical energy into heating energy. Such resistive heating elements are typically in or on the thermoblock's mass at a distance of more than 1 mm, in particular 2 to 50 mm or 5 to 30 mm, from the duct. The heat is supplied to the thermoblock's mass and via the mass to the circulating liquid. The heating elements may be cast or housed into the metal mass or fixed against the surface of the metal mass. The duct or ducts may have a helicoidal or another arrangement along the thermoblock to maximise its/their length and heat transfer through the block.

A drawback of thermoblocks lies in the difficulty to accurately control the temperature and to optimise the required heating energy for bringing the liquid to be heated to the desired temperature. Indeed, the thermal inertia of the metal mass, the localised and uneven resistive heating of the mass, the dynamic heat diffusion from the heating in the mass to different parts of the mass affecting the measured temperature of the mass at predetermined locations make an accurate control of the thermoblocks to heat the circulating liquid to a desired predetermined temperature quite difficult and moreover requires quite long pre-heating periods, typically of 1 to 2 min in the case of espresso machines. Furthermore, it is difficult to predict various parameters involving the subsequent use of the thermoblock produced in series, e.g. the temperature of the environment, the net voltage of the mains, the actual value of the heating resistor of the thermoblock, thermal insulation of the thermoblock, the initial temperature of the liquid circulated through the thermoblock. Consequently, thermoblocks are usually associated with dynamic loop-controlled powering circuit tailoring the powering of the thermoblock with continuous measuring of the temperature by means of at least one temperature sensor. However, due to the complex thermal flow of such a system, the stabilisation of the thermoblock at a certain temperature level adjusted to the real heating needs of the flow of liquid to be circulated is lengthy and still difficult to achieve.

An approach to improve the heating accuracy is taught in EP 1 380 243. This patent discloses a heating device intended in particular to equip coffee machines. This heating device comprises a metal tube through which the liquid that is to be heated can flow from an inlet duct to an outlet duct. The exterior surface of the tube is covered over several sections of its length with a plurality of sets of electric resistive elements in series. A cylindrical insert extends inside the tube to form, with the interior wall of the tube, a helical duct through which the liquid can circulate and which thus encourages turbulent flow and rapid transfer of energy from the tube to the liquid. A flowmeter is also positioned upstream of the inlet duct. The device further comprises a plurality of temperature sensors distributed along the length of the tube at the entry to and exit from each set of resistive elements. The principle governing the distribution of heating energy to the liquid in this instance is based on modulating the electrical power produced by the resistive elements which can be switched independently of one another or in series according to the water temperature at the inlet to the duct. Although this device gives results which are satisfactory in terms of the speed of heating, this device is relatively bulky in that the volume of water to be heated determines the height of the tube, and is expensive in that it requires resistive elements to be printed in the form of thick films on the surface of the tube, using what is currently known as "thick film" technology.

In addition, more or less complex attempts to improve the thermal control of heaters for batch or in-line low inertia heaters have been proposed in DE 197 11 291, EP 1 634 520, U.S. Pat. Nos. 4,700,052 and 6,246,831.

Other methods for controlling heaters are known from different documents like WO 2008/023132, which describes an evaluation of the system heat up speed and calculation of needed energy, but which is mostly based to relay technology and different water content of the heater, like a water cooker.

WO 2011/157675 describes a unit for controlling transmission of power to a thermal conditioning device for a beverage preparation machine. The thermal conditioning device comprises a controller with a start-up profile for starting-up said device from a temperature of inactivity to an operative temperature, for bringing to a target temperature a fluid circulating therethrough at start-up end. The controller is arranged to allow circulation of fluid through the device at start-up end, and to compare the determined temperature of fluid circulated at start-up end to the target temperature. A temperature difference is then derived therefrom. The start-up profile has at least one parameter and the controller has a self-learning mode for adjusting this parameter as a function of the derived temperature difference. The adjusted parameter is then stored for a subsequent starting-up of said device. Although this device and the corresponding method allow improving subsequent starting-ups of the thermal conditioning device, each time the operating or environmental conditions of the corresponding beverage preparation machine are changed, the quality of the first beverage prepared after completion of a start-up may be sub-optimal due to a difference between the actual temperature of the liquid and the target temperature.

EP 0 935 938 B1 describes an automatic start of a pump after heat up target is reached, and concerns in general measuring of temperature with a resistance based temperature sensor to monitor temperature of a heater. Different heat up cut-off temperatures are contemplated for the heater depending on the temperature of the heater at powering thereof.

There is still a need to provide a simple and reliable control of a start-up phase for thermal conditioning devices, in particular for thermoblocks, for accurately reaching an operative temperature of the thermal conditioning device at the end of the start-up phase, such that a liquid circulated through the thermal conditioning device is directly heated at a target temperature.

SUMMARY OF THE INVENTION

An object of the invention is to provide a beverage preparation machine comprising a thermal conditioning device, for example a heating device, preferably with a heat accumulator, such as a thermoblock, that has an optimized start-up profile for reaching as precisely as possible an operative temperature at start-up end, in order to allow the preparation of a first beverage after start-up in optimal conditions.

An object of the invention is in particular to provide beverage preparation machine comprising a thermal conditioning device with a start-up profile and a corresponding control method that allows avoiding or minimizing any temperature over- or undershoot at start-up end.

These objects and other advantages are reached in particular by a beverage preparation machine according to the corresponding independent claim and its dependent claims.

These objects and other advantages are reached furthermore by a method of operating and/or self-calibrating the thermal conditioning device of such a beverage preparation machine.

These objects and other advantages are reached by a beverage preparation machine comprising a thermal conditioning device, such as a heater or cooler, said thermal conditioning device comprising a control unit for controlling a start-up phase of the thermal conditioning device from a temperature of inactivity to an operative temperature, the control unit comprising: a controller with a start-up profile for starting-up a thermal conditioning device, wherein the start-up profile has at least one parameter and the controller has a self-learning mode for adjusting the at least one parameter; and a temperature sensor connected to the controller for measuring a temperature of the thermal conditioning device; wherein the self-learning mode causes the controller during a start-up phase to: calculate a ramp value representative of a rate of change in temperature during the start-up phase of the thermal conditioning device; adjust the at least one parameter as a function of the adjusted ramp value; use the adjusted at least one parameter for a remainder of the start-up phase.

The at least one parameter is for example a duration of at least part of the start-up phase and/or an electrical energy transmitted to the thermal conditioning device during at least part of the start-up phase.

In embodiments, the controller is configured to calculate the ramp value as a ramp time duration measured by the controller for the thermal conditioning device to go from a first calibration temperature to a second calibration temperature during the start-up phase, divided by the difference between the second calibration temperature and said first calibration temperature.

In embodiments, the thermal conditioning device has a thermal accumulator or a thermoblock.

The controller preferably includes at least a clock to launch measures of temperature at periodic time intervals.

Preferably, the controller is furthermore configured to supply energy to the thermal conditioning device after the start-up phase, using a flow coefficient representative of the power required by the thermal conditioning device to remain at the operating temperature while a liquid circulates through it, wherein the flow coefficient is determined on the basis of the last calculated ramp value.

The beverage preparation machine is for example arranged for preparing coffee. The beverage preparation machine for example comprises a capsule processing arrangement to prepare a beverage, such as coffee, using ingredients, for example ground coffee, contained in one or more capsules. The beverage preparation machine typically further comprises a fluid circuit connecting the capsule processing arrangement to a source of liquid, for example water, for supplying the liquid to the capsule processing arrangement. The fluid circuit then typically comprises the thermal conditioning device for heating and/or cooling the liquid supplied to the capsule processing arrangement.

These objects and other advantages are furthermore reached by a method for controlling a start-up phase of a thermal conditioning device, such as a heater or cooler, of a beverage preparation machine, the thermal conditioning device comprising for example a thermal accumulator or a thermoblock, the method comprising: loading a ramp value representative of a rate of change in temperature of the thermal conditioning device during a previous start-up phase; determining a parameter of the start-up phase on the basis of a start temperature of the thermal conditioning device, a stored operative temperature of the thermal conditioning device and the loaded ramp value; powering up the thermal conditioning device; entering a self-learning mode if a temperature of the thermal conditioning device is not comprised between a predetermined threshold temperature value and the operative temperature; in the self-learning mode, measuring a ramp time duration for the thermal conditioning device to go from a first calibration temperature to a second calibration temperature; calculating an adjusted ramp value based on this ramp time duration; adjusting the parameter on the basis of the calculated ramp value and continuing the start-up phase with the adjusted parameter.

In embodiments, the parameter is a duration of at least part of the start-up phase. The start-up phase is preferably resumed once this duration has lapsed. In embodiments, the adjusted ramp value is calculated by dividing the ramp time duration by a difference between the second calibration temperature and the first calibration temperature.

Preferably, the method further comprises the step of, after start-up phase, supplying energy to the thermal conditioning device, using a flow coefficient representative of the power required by the thermal conditioning device to remain at the operating temperature while a liquid circulates through it, wherein the flow coefficient is determined on the basis of the last calculated ramp value.

According to the invention, the start-up phase is accurately controlled in that at least one parameter of the start-up profile, for example the duration of the start-up phase, may be corrected in a self-learning mode during the start-up phase in order to adjust it to the current environmental and/or power supply conditions, thereby avoiding temperature over- or undershoots at the end of the start-up phase that might impair the quality of the first beverage prepared after start-up.

Furthermore, using the last calculated ramp value to adjust and/or correct a flow coefficient, which is used to determine the energy required by the thermal conditioning device in order for it to be maintained at the operative temperature while liquid is circulated through it, i.e. the energy required by the thermal conditioning device to bring at a target temperature the liquid, for example water, circulating through it, allows providing the right amount of electrical energy to the thermal conditioning device during beverage preparation in order to obtain a liquid and thus a beverage at the correct target temperature in almost any environmental and/or power supply conditions of the machine.

BRIEF DESCRIPTION OF THE DRAWINGS

The invention will now be described with reference to the figures, wherein.

DETAILED DESCRIPTION

The following description of exemplary embodiments according to the invention is related to electrical devices for the preparation of beverages, in particular to machines for the preparation of beverages from ingredients contained in capsules.

Figure 1:
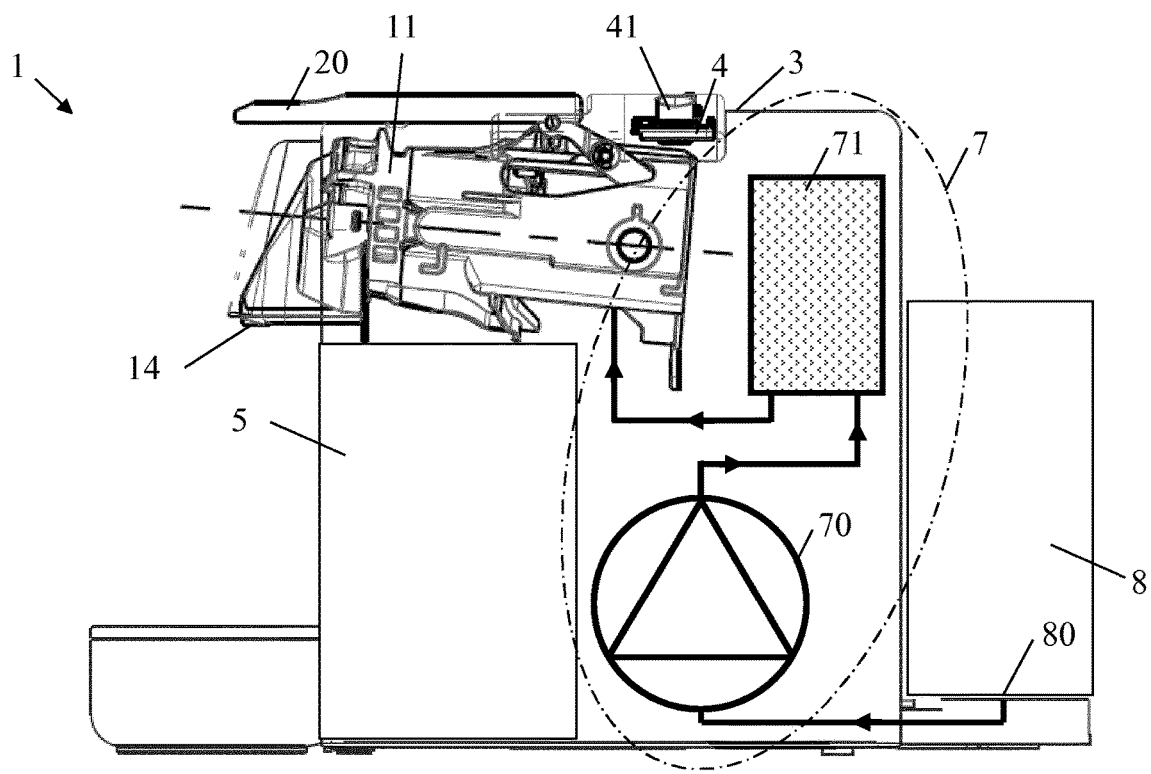
FIG. 1 is a schematic illustration of a beverage preparation machine comprising a thermal conditioning device.

FIG. 1 schematically illustrates an exemplary embodiment of such a beverage preparation machine 1. The beverage preparation machine for example comprises a fluid circuit 7 connecting a capsule processing arrangement 11 to a source of liquid, for example water, such as a liquid reservoir 8 connected to fluid circuit 7 by a reservoir outlet 80. Fluid circuit 7 preferably includes at least one device 70, 71 selected from: a pump 70 e.g. a solenoid (reciprocating piston) pump or a peristaltic pump or a diaphragm pump; and a thermal conditioning device 71, e.g. a heater and/or a cooler, comprising for example a thermoblock. The fluid circuit may further comprise one or more sensors such as a temperature sensor, e.g. a temperature sensor integrated in or separate from a thermal conditioning device 71, or a pressure sensor, e.g. a pressure sensor downstream a pump 70, or a flow meter, e.g. a flowmeter upstream a pump 70. Such device 70, 71 and/or sensors are preferably controlled and/or powered via a control unit 4.

The capsule processing arrangement 11 is adapted to prepare a beverage using ingredients contained in one or more capsules, for example two capsules, with the liquid, for example water, supplied from the fluid circuit 7. The capsule processing arrangement 11 for example comprises a brewing unit, a dissolution unit, a mixing unit, or a combination thereof. In an open position, the capsule processing arrangement 11 for example delimits a capsule insertion channel for allowing the insertion of one or more capsules therein. In a closed position, the capsule processing arrangement 11 may hold an inserted capsule in a preferably closed chamber for processing the capsule and preparing a corresponding beverage or part of beverage.

Machine 1 is for example a beverage preparation machine having a capsule processing arrangement 11, for example a brewing, infusion or dilution unit, for processing a single capsule at a time and operated in the following manner:

First, the capsule processing arrangement 11 is opened, for example by actuating a handle 20 that commands the closing and opening of the capsule processing arrangement 11. To open the capsule processing arrangement 11, the handle 20 is for example pivoted around an axis 21 from a first position in which handle 20 is aligned with a housing 3 of the machine 1 and the capsule processing arrangement 11 is in its closed position, to a second position not represented in the figures, in which the handle is raised above the housing and the capsule processing arrangement is in its open position.

Then, a capsule is for example inserted in the capsule processing arrangement 11 in the open position, e.g. via a capsule insertion channel as described above.

The capsule processing arrangement 11 is then closed by pivoting the handle 20 about its rotation axis 21 between second and first positions to secure the inserted capsule in a processing configuration within the capsule processing arrangement 11.

Then, the capsule is processed to prepare the beverage, e.g. by activating the device(s) of the above described fluid circuit 7. The processing of the capsule is for example initiated by actuating a user interface element, for example a push button 41, and preferably controlled by the control unit 4. The prepared beverage is dispensed via an outlet 14 of the machine 1, which is in fluidic communication with the capsule processing arrangement 11, into a user-recipient placed under said outlet 14.

Finally, handle 20 is for example actuated again to pivot about its rotation axis 21 between first and second positions to bring the capsule processing arrangement 11 into the open position, in order to remove, e.g. by gravity, the processed capsule from the capsule processing arrangement 11. The processed capsule may be removed to a removable receptacle 5 of the beverage preparation machine 1.

The capsule for example contains one or more ingredients for at least partly preparing tea, coffee, hot chocolate, cold chocolate, milk, soup or baby food.

Figure 2:
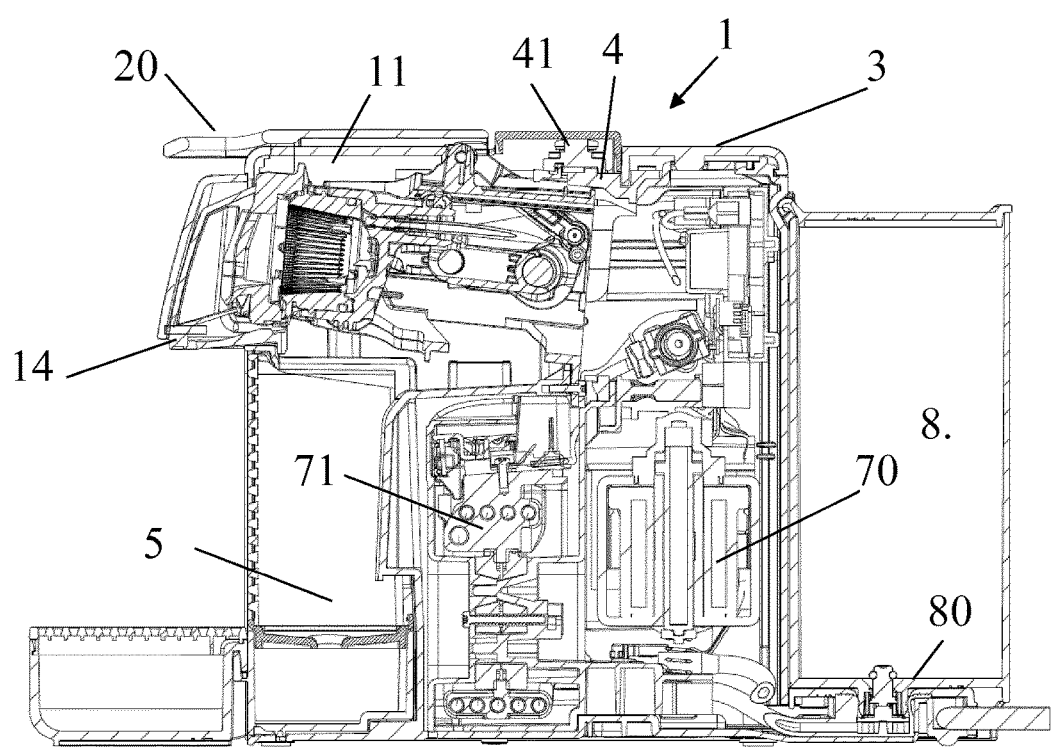
FIG. 2 is a cut-view of a beverage preparation machine comprising a thermal conditioning device.

FIG. 2 shows an exemplary embodiment of the beverage preparation machine 1 of FIG. 1 in the form of a coffee machine, wherein the capsule processing arrangement is a brewing unit 11 for preparing coffee from a capsule containing ground coffee and the thermal conditioning device 71 is a thermoblock.

With reference to FIG. 1 and FIG. 2, the control unit 4 preferably controls transmission of power to the thermal conditioning device 71 and to the pump 70. The control unit 4 for example comprises a controller, e.g. a micro-controller or processor, which is not illustrated in the figures, for controlling the functions of the control unit 4, with a start-up profile for starting-up the thermal conditioning device 71 from a start temperature, for example a temperature of inactivity, to an operative temperature at the end of the start-up phase, wherein the operative temperature preferably corresponds to the temperature of the thermal conditioning device 71 for bringing to a target temperature a fluid circulating through said thermal conditioning device 71. The control unit 4 comprises a first temperature sensor connected to the controller and thermally coupled to the thermal conditioning device 71 for sensing the temperature of the thermal conditioning device 71.

The control unit 4 is preferably configured to allow circulation of fluid through the thermal conditioning device 71 at the end of a start-up phase, i.e. once the thermal conditioning device 71 has reached its operative temperature, by actuating the pump 70. The control unit 4 optionally comprises a second temperature sensor connected to the controller to measure a temperature of the fluid, e.g. water, at the output of the thermal conditioning unit 71. The control unit 4 may for example be configured to compare to a target temperature the temperature of the fluid circulated through the thermal conditioning unit 71 after the start-up phase.

According to the invention, the start-up profile has at least one parameter. The parameter is preferably a duration of at least part of the start-up phase and/or a quantity of the electrical energy transmitted to the thermal conditioning device 71 during at least part of the start-up phase. According to the invention, the controller has a self-learning mode for adjusting the at least one parameter during a start-up phase, and to use the adjusted at least one parameter to control the remainder of the start-up phase. The at least one parameter is preferably adjusted as a function of a ramp value representative of a rate of change in temperature of the thermal conditioning device, determined during the start-up phase. The ramp value is preferably stored and used for calculating a duration of at least part of a subsequent start-up phase.

In a preferred embodiment explained in further details below, the at least one parameter of the start-up profile is a duration of at least part of the start-up phase.

Figure 3:
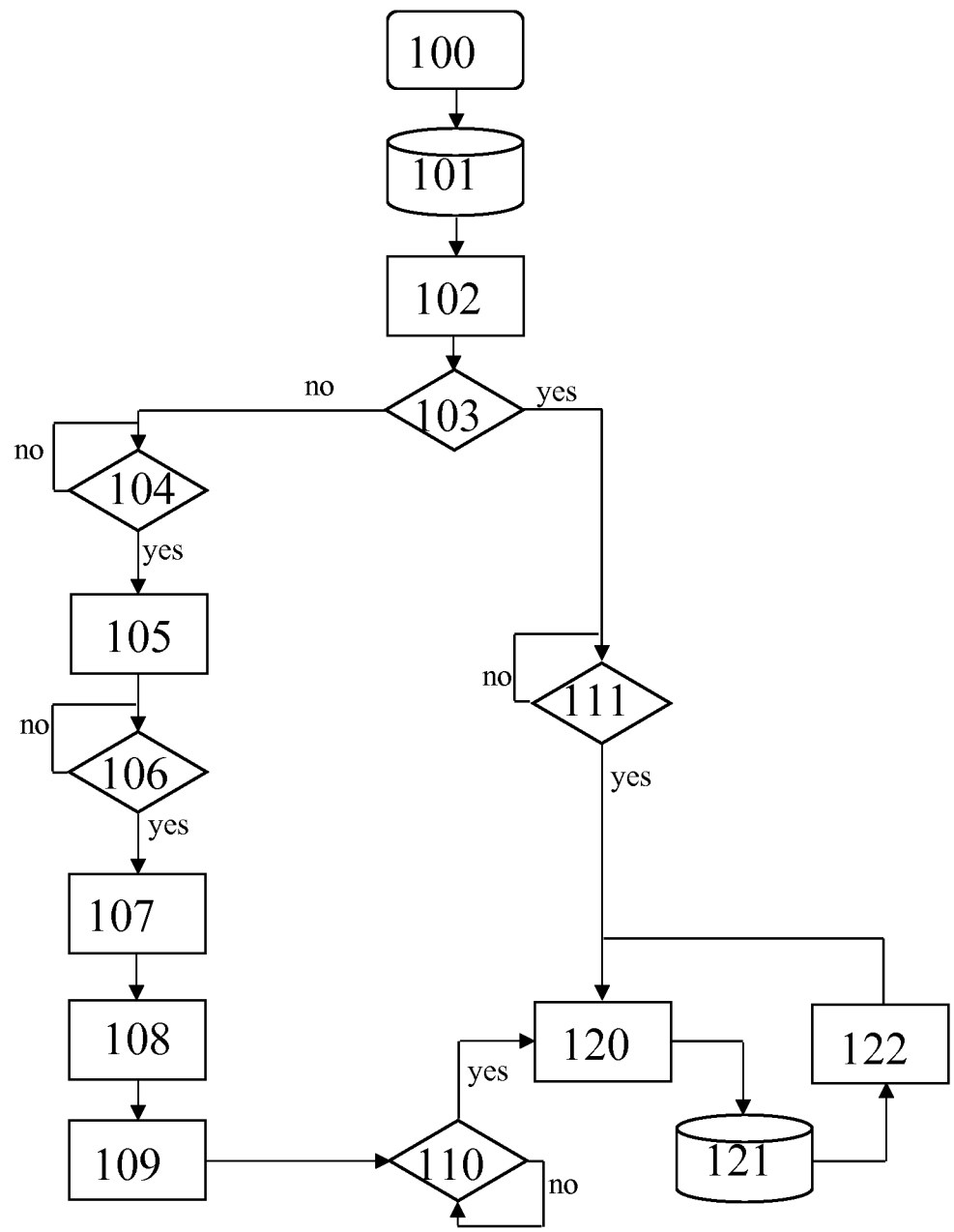
FIG. 3 is a flow chart diagram illustrating a method for controlling a thermal conditioning device according to the invention.

With reference to FIG. 3, the beverage preparation machine is activated at step 100. The beverage preparation machine is for example turned on after a period of inactivity. The control unit thus initiates a start-up phase to bring the thermal conditioning device from a start temperature, i.e. the temperature of the thermal conditioning device at the beginning of the start-up phase, to a predetermined operative temperature. The operative temperature typically corresponds to the temperature required for the thermal conditioning device to bring a liquid, for example water, circulating through it at a target temperature appropriate for the preparation of a given beverage.

At 101, the controller of the control unit 4 loads a previously stored ramp value representative of a rate of change in temperature of the thermal conditioning device. The previously stored ramp value is for example a default ramp value stored in a memory of the control unit during production of the machine. Preferably, the previously stored ramp value is a ramp value determined during a previous start-up phase of the beverage preparation machine.

At 102, the controller measures the temperature of the thermal conditioning device; calculates a start-up phase duration based on: the measured start temperature, the known operative temperature and the ramp value loaded at 101; and starts powering up the thermal conditioning device to bring it to the operative temperature. The start-up phase duration is for example calculated as:

$$t_{start-up} = (TO - TS) \cdot R \qquad (1)$$

where TO is the operative temperature in °C., TS is the start temperature in °C. and R is the ramp value in s/°C. The ramp value thus for example represents the time in seconds necessary for modifying the thermal conditioning device's temperature of 1° C. when it is powered during the start-up phase, i.e. when preferably no liquid circulates through the thermal conditioning device.

Preferably immediately after initiating the start-up phase, the controller checks at 103 whether the temperature of the thermal conditioning device, for example its start temperature or its instant temperature, is equal to a threshold temperature or whether it is comprised between the threshold temperature and the operative temperature, i.e. the controller checks if $$T_{threshold} = < T < TO \qquad (2)$$

in case the start-up phase is a heat-up phase, or if $$TO < T = < T_{threshold} \qquad (3)$$

in case the start-up phase is a cool-down phase, where $T_{threshold}$ is the threshold temperature, T is the temperature of the thermal conditioning device at step 103 and TO is the operative temperature.

If the result of test 103 is positive, i.e. if the appropriate one of the conditions (2) or (3) above is fulfilled, the controller continues powering the thermal conditioning device until the end of the start-up phase duration calculated at 102 is reached (test 111).

Once the calculated start-up phase duration is reached, the thermal conditioning device is at its operative temperature and the beverage preparation machine enters a ready mode at step 120, in which it is ready to prepare a beverage.

If the result of test 103 is negative, i.e. if the appropriate one of condition (2) or (3) above is not fulfilled, the controller enters a self-learning mode.

In the self-learning mode, the controller regularly measures the temperature of the thermal conditioning device and checks at 104 whether it has reached a first calibration temperature, i.e. the controller checks if $$T >= TC_1 \quad (4)$$

in case the start-up phase is a heat-up phase, or if $$T =< TC_1, \quad (5)$$

in case the start-up phase is a cool-down phase, where T is the temperature of the thermal conditioning device at step 104 and $TC_1$ is the first calibration temperature. Preferably, $TC_1 > T_{threshold}$ in case the start-up phase is a heat-up phase and $TC_1 < T_{threshold}$ in case the start-up phase is a cool-down phase.

The test 104 is repeated at regular intervals as long as its result is negative.

If the test 104 is positive, i.e. once the first calibration temperature is reached, the controller initiates a ramp time measurement phase at step 105.

During ramp up time measurement phase, the controller continues regularly measuring the temperature of the thermal conditioning device and checks at 106 whether it has reached a second calibration temperature, i.e. the controller checks if $$T >= TC_2 \quad (4)$$

in case the start-up phase is a heat-up phase, or if $$T =< TC_2, \quad (5)$$

in case the start-up phase is a cool-down phase, where T is the temperature of the thermal conditioning device at step 104 and $TC_2$ is the second calibration temperature. Preferably, $TC_1 < TC_2 < TO$ in case the start-up phase is a heat-up phase and $TC_1 > TC_2 > TO$ in case the start-up phase is a cool-down phase.

The test 106 is repeated at regular intervals as long as its result is negative.

If the test 106 is positive, i.e. once the second calibration temperature is reached, the controller stops the ramp time measurement phase at step 107.

At step 108, the controller calculates an adjusted ramp value as the duration of the ramp time measurement phase divided by the difference between the second calibration temperature and the first calibration temperature:

$$R_{adjusted} = t_{ramp}/(TC_2 - TC_1) \quad (6)$$

where $R_{adjusted}$ is the adjusted ramp value in s/° C. and $t_{ramp}$ is the measured duration in seconds of the ramp time measurement phase.

At step 109, the controller calculates a remaining start-up phase duration based on the temperature of the thermal conditioning device at step 109, the known operative temperature and the adjusted ramp value:

$$t_{remain\ start-up} = (TO - T) \cdot R_{adjusted} \quad (7)$$

where $t_{remain\ start-up}$ is the remaining time from step 109 to the end of the start-up phase and T is the temperature of the thermal conditioning device at step 109

Alternatively or additionally, at step 109 the controller recalculates the entire start-up phase duration on the basis of the start temperature, the operative temperature and the adjusted ramp value:

$$t_{start-up\ recalculated} = (TO - TS) \cdot R_{adjusted} \quad (8)$$

where $t_{start-up\ recalculated}$ is the recalculated duration of the start-up phase in seconds.

The adjusted ramp value is preferably stored for use in a next start-up phase and preferably replaces the previously stored ramp value.

After step 109, the controller continues powering the thermal conditioning device until the end of the remaining start-up phase duration calculated at 109 and measured from step 109, and/or the recalculated start-up phase duration calculated at 109 and measured from step 102, is reached (test 110).

If test 110 is positive, i.e. once the remaining start-up phase duration and/or the recalculated start-up phase has lapsed, the thermal conditioning device is at its operative temperature, the start-up phase is ended, the power supply to the thermal conditioning device is interrupted or reduced, and the beverage preparation machine enters a ready mode at step 120, in which it is ready to prepare a beverage.

Once the machine is ready at step 120, it may enter a beverage preparation cycle 121, 122, for example automatically or upon activation by a user of a user interface, for example a push button.

At step 121, the controller preferably loads a flow coefficient representative of the power required by the thermal conditioning device to remain at the operating temperature while a liquid circulates through it, i.e. representative of the power required by the thermal conditioning device to maintain the liquid flowing out of it at the target temperature. The flow coefficient is for example determined on the basis of the last calculated ramp value and known or measured characteristics of the thermal conditioning device.

At step 122, the controller supplies energy to the thermal conditioning device, using the previously loaded flow coefficient and the fluid circuit of the beverage preparation machine is activated to circulate a liquid, for example water, from the reservoir through the thermal conditioning device and into the capsule processing arrangement for preparing a beverage. Once the beverage preparation is finished, the machine returns in a ready state at step 120.

Figure 4:
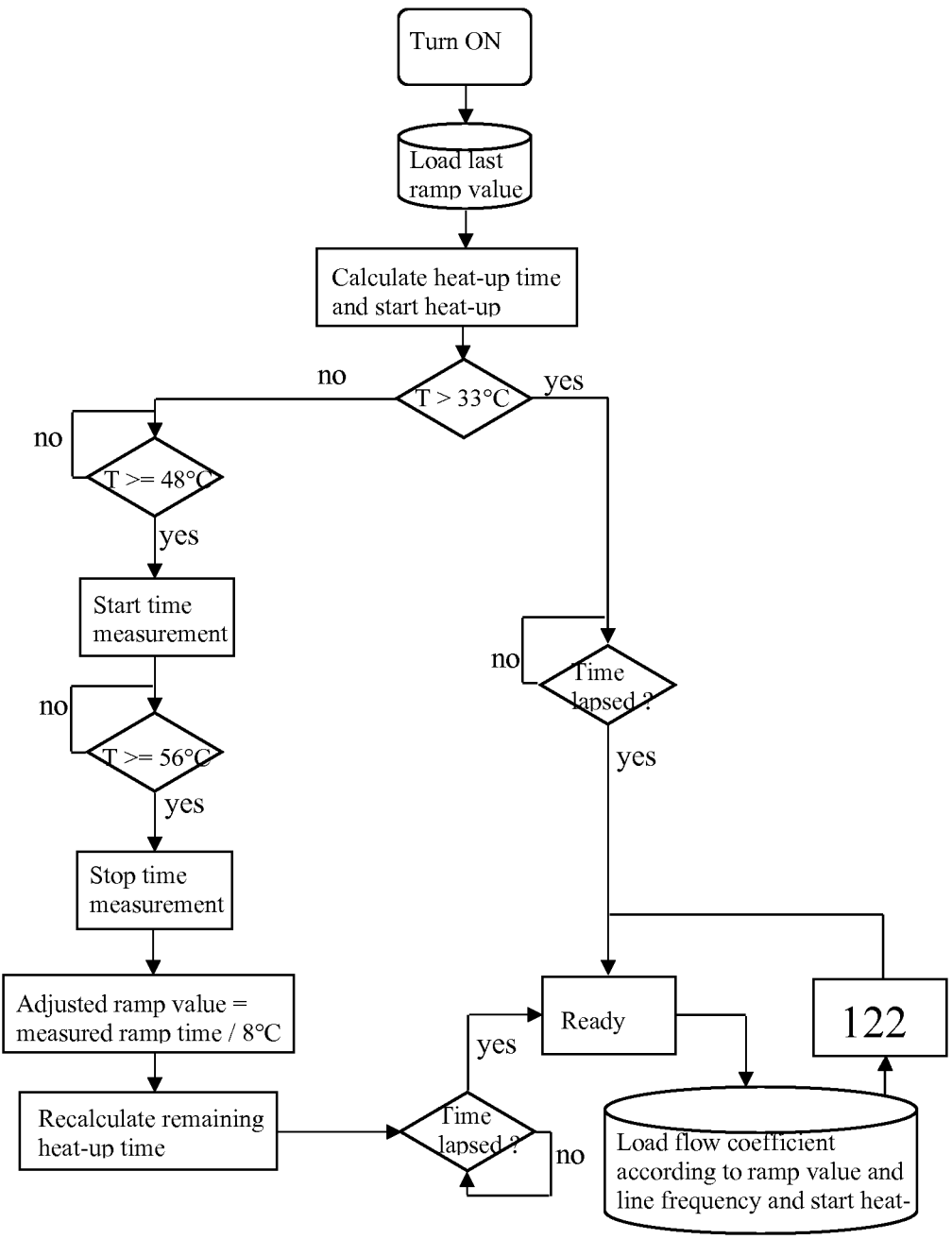
FIG. 4 is a flow chart of a particular example of the method of the invention.

FIG. 4 illustrates the method described above in an exemplary but in no way limiting particular embodiment, wherein the beverage preparation machine is a coffee machine having a thermoblock as a thermal conditioning device, the threshold temperature value is 33° C., the first calibration value is 48° C. and the second calibration value is 56° C. The operative temperature is for example 95° C.

According to this embodiment, the start-up phase is thus a heat-up phase. A cold heat up can for example be defined as a heat up process that starts with a thermoblock temperature below the threshold temperature of 33° C., corresponding for example to a situation where the coffee machine is powered up after some hours of inactivity. During each such cold heat up phase, the calculation of an adjusted ramp value and corresponding correction and/or recalculation of the heat-up phase duration is done in order to optimize the heat-up phase duration, taking into account the current operating conditions of the machine that may influence its heat-up time, such as for example the voltage of the mains power supply, the ambient temperature, etc. A warm heat-up occurs when the thermoblock has to be heated up to the operative temperature from a start temperature above the threshold temperature of 33° C. Then the system is not able to determine the ramp value and thus the last stored ramp value is considered for determining the heat-up phase duration. This situation for example occurs when the machine is reactivated after some minutes of inactivity, for example some minutes after having entered a stand-by mode.

According to this embodiment, in the case of a cold heat-up, once the machine has been turned on or reactivated, the controller loads the last stored ramp value and calculates a duration of the heat-up phase based on: the loaded ramp value, the instant temperature of the thermoblock and a stored operative temperature. The controller then starts the heat-up phase by starting powering the thermoblock in order to heat it up. The controller then preferably immediately checks whether the instant temperature of the thermoblock or its start temperature, is equal to or higher than 33° C. Since this is not the case, the machine enters the self-learning mode. In the self-learning mode, the controller measures the temperature of the thermoblock and checks it against the first calibration temperature at regular intervals. As soon as the measured temperature is equal or higher than 48° C., it starts measuring time to determine a ramp up time. The controller continues measuring the temperature of the thermoblock and checks it against the second calibration temperature at regular intervals. As soon as the measured temperature is equal or higher than 56° C., it stops measuring time. The measured ramp up time thus corresponds to the time measured between the start and the stop of the corresponding time measurement. The ramp up time in seconds is then divided by 8° C. in order to obtain an adjusted ramp value in s/° C. The remaining duration of the heat-up phase is calculated on the basis of: the adjusted ramp value, the instant temperature of the thermoblock and the operative temperature; and/or the heat-up phase duration is recalculated on the basis of: the adjusted ramp value, the start temperature of the thermoblock and the operative temperature. The thermoblock is heated further until either one of the remaining heat-up phase duration or the recalculated heat-up phase duration is reached. The machine then enters ready mode and can prepare a beverage as explained above.

In the case of a warm heat-up, the controller loads the last stored ramp value and calculates a heat-up phase duration based on: the ramp value, the start temperature and a stored operative temperature. The controller then starts the heat-up phase by starting powering the thermoblock in order to heat it up. The controller then preferably immediately checks whether the instant temperature of the thermoblock or its start temperature, is equal to or higher than 33° C. Since this is the case, the controller continues heating the thermoblock until the calculated duration of the heat-up phase is reached. The machine then enters ready mode and can prepare a beverage as explained above.

The start-up profile according to the invention and the corresponding method are arranged in order to optimize the start-up phase of the thermal conditioning device for a beverage preparation machine, for example for a coffee machine in which a liquid is circulated through a thermoblock and then guided into a brewing chamber for brewing coffee supplied into a capsule contained the brewing unit.

According to the device and method of the invention, the at least one parameter of the start-up profile, for example the duration of the start-up phase, is adjusted based on temperature measurements made during the start-up phase, or during a previous start-up phase, i.e. before the initiation of a beverage preparation, i.e. while the machine's fluid circuit is deactivated. The ramp value used for calculating for example the time of at least part of the start-up phase is thus representative of the change in temperature of the thermal conditioning device while no liquid circulates through the thermal conditioning device.

This allows precisely determining the parameters of the start-up profile, in particular it allows calculating a precise duration of the start-up phase and/or of the energy to deliver to the thermal conditioning device, in order to precisely reach the operative temperature at the end of the start-up phase and thus have optimal beverage preparation conditions from the first beverage on after start-up of the machine.

In embodiments, the control unit comprises:
at least a first temperature sensor connected or integrated to the controller for measuring the temperature of the thermal conditioning device; and
at least one clock to launch measures of temperature at periodic time intervals.

Preferably it also includes:
data storage means for storing at least one ramp value, an operative temperature, a first and a second calibration temperatures, and said measured temperatures at said periodic time intervals; and
calculation means for calculating a start-up phase duration, ramp values, etc.

According to the invention, these calculation means are arranged for:
a) calculating ramp values between different stored calibration temperature values; and
b) calculating a duration of at least part of a start-up phase by subtracting a start or current temperature from said operative temperature, and multiplying it by a ramp value. The ramp value may depend for example on the environmental and/or power supply conditions of the machine.

The improvements and advantages achieved by the invention include a self calibrating system to optimize start-up of a beverage preparation machine, resulting in an optimally adjusted start-up phase for every starting temperature, any thermal conditioning device power tolerance, network voltage tolerance, water in thermoblock, thermal conditioning device energy loss and environmental temperature, thanks to regularly adjusted parameters of the start-up profile and immediate use of any newly adjusted parameter in the current start-up phase, thereby resulting in accurate regulation of the thermal conditioning device temperature and optimal beverage preparation results, even for the first beverage after start-up.

Furthermore, using the last calculated ramp value to adjust and/or correct the flow coefficient, which is used to determine the energy required by the thermal conditioning device in order for it to be maintained at the operative temperature while liquid is circulated through it, i.e. the energy required by the thermal conditioning device to bring at a target temperature the liquid, for example water, circulating through it, allows providing the right amount of electrical energy to the thermal conditioning device during beverage preparation in order to obtain a liquid and thus a beverage at the correct target temperature in almost any environmental and/or power supply conditions of the machine.

The invention claimed is:

1. A method for controlling a start-up phase of a thermal conditioning device of a beverage preparation machine, the method comprising:
    loading a ramp value representative of a rate of change in temperature of the thermal conditioning device during a previous start-up phase;
    determining a parameter of the start-up phase based on a start temperature of the thermal conditioning device, a stored operative temperature of the thermal conditioning device, and the loaded ramp value;
    powering up the thermal conditioning device;
    the thermal conditioning device comprising a controller that has a self-learning mode for adjusting the parameter;
    determining that a temperature of the thermal conditioning device is not between a predetermined threshold temperature value and the stored operative temperature;
    entering the self-learning mode when the temperature of the thermal conditioning device is not between the predetermined threshold temperature value and the stored operative temperature;
    in the self-learning mode, measuring a ramp time duration for the thermal conditioning device to go from a first calibration temperature to a second calibration temperature;
    calculating an adjusted ramp value based on the ramp time duration; and
    adjusting the parameter based on the adjusted ramp value and continuing the start-up phase with the adjusted parameter.

2. The method according to claim 1, wherein the parameter is a duration of at least part of the start-up phase.

3. The method according to claim 1, wherein the start-up phase is resumed once the ramp time duration is lapsed.

4. The method according to claim 1, wherein the adjusted ramp value is calculated by dividing the ramp time duration by a difference between the second calibration temperature and the first calibration temperature.

5. The method according to claim 1, further comprising determining a flow coefficient based on the adjusted ramp value, wherein the flow coefficient is representative of a power required by the thermal conditioning device to remain at the stored operative temperature while a liquid circulates through the thermal conditioning device; and
    after the start-up phase, supplying energy to the thermal conditioning device according to the flow coefficient.

6. The method according to claim 1, wherein the thermal conditioning device comprises a thermal accumulator or a thermoblock.

7. The method according to claim 1 comprising powering the thermal conditioning device until an end of the start-up phase when the temperature of the thermal conditioning device is between the predetermined threshold temperature value and the stored operative temperature.

* * * * *